US012770020B2

(12) United States Patent
Guo et al.

(10) Patent No.: US 12,770,020 B2
(45) Date of Patent: Oct. 20, 2026

(54) PRIVACY-PRESERVING TASK-ORIENTED SEMANTIC COMMUNICATION METHOD AND SYSTEM

(71) Applicant: SHANDONG UNIVERSITY, Jinan (CN)

(72) Inventors: Shuaishuai Guo, Jinan (CN); Yanhu Wang, Jinan (CN); Shujing Li, Jinan (CN); Anbang Zhang, Jinan (CN); Shuai Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 510 days.

(21) Appl. No.: 18/537,032

(22) Filed: Dec. 12, 2023

(65) Prior Publication Data

US 2025/0165809 A1 May 22, 2025

(51) Int. Cl.
*G06N 5/02* (2023.01)
*G06F 21/62* (2013.01)

(52) U.S. Cl.
CPC .......... *G06N 5/02* (2013.01); *G06F 21/6245* (2013.01)

(58) Field of Classification Search
CPC .............................. G06N 5/02; G06F 21/6245
See application file for complete search history.

(56) References Cited

U.S. PATENT DOCUMENTS

2017/0039390 A1* 2/2017 King ..................... G06F 16/958
2022/0092216 A1* 3/2022 Mohassel ............ G06F 21/6245
2022/0188978 A1 6/2022 Hu et al.
2023/0070443 A1 3/2023 Cheng et al.
2023/0273994 A1* 8/2023 Mohammady ........ G06F 21/554 726/23
2024/0193433 A1* 6/2024 Khan ..................... G06N 3/098

FOREIGN PATENT DOCUMENTS

CN 115713933 A 2/2023

OTHER PUBLICATIONS

Minglong Li, Research on intent-based decentralized task planning methods «CNKI China Doctoral Dissertations Full-text Database» p. 1-34, 112 Publication date:Feb. 15, 2023.

* cited by examiner

*Primary Examiner* — Omar F Fernandez Rivas
*Assistant Examiner* — Shamcy Alghazzy
(74) *Attorney, Agent, or Firm* — CBM PATENT CONSULTING, LLC

(57) ABSTRACT

The invention relates to a privacy-preserving task-oriented semantic communication method and system, and the operation scenario includes a user, an edge server and a potential adversary which includes: (1) Establishing a privacy-oriented task-oriented semantic communication system model; (2) Constructing an objective function; (3) Reconstructing the constructed objective function; (4) Designing adversarial learning mechanisms to train the semantic communication system model; (5) Performing task-oriented semantic communication using the trained semantic communication system model. Compared to existing designs, the proposed solution in this invention achieves a good balance between privacy and utility.

5 Claims, 4 Drawing Sheets

PRIVACY-PRESERVING TASK-ORIENTED SEMANTIC COMMUNICATION METHOD AND SYSTEM

CROSS-REFERENCE TO RELATED APPLICATIONS

This application claims priority to Chinese Patent Application Ser. No. CN2023104882058 filed on 4 May 2023.

TECHNICAL FIELD

The invention relates to a privacy-preserving task-oriented semantic communication method and system, belonging to the wireless communication technical field.

BACKGROUND OF THE INVENTION

In order to further improve the performance of communication systems, deep learning is applied in the field of communication, such as joint source-channel coding, channel estimation, and wireless resource management. However, emerging intelligent applications, such as AR/VR, autonomous driving, and environmental monitoring, pose serious challenges to deep learning-based communication systems designed to reliably transmit data. For instance, in the case of autonomous driving, the onboard sensor systems collect a vast amount of data during the driving process. If all the data were directly transmitted to the roadside units for inference, it might result in excessive communication delays, hindering efficient decision-making. To address this issue, a task-oriented semantic communication approach has been proposed. In this method, the transmitting end extracts and transmits only the task-relevant information during the communication process.

The existing semantic communication schemes heavily rely on deep learning techniques and directly transmit semantic features, which could easily lead to privacy leakage issues. For example, an attacker could use model inversion to reconstruct the illegally obtained transmitted features back into the original inputs, thereby violating user privacy. Despite the maturity of privacy protection methods, they are challenging to directly apply to semantic communication systems. On the one hand, deep learning-driven semantic communication systems are primarily based on autoencoder architectures, trained through end-to-end training. The introduction of existing privacy protection methods might impede the training of semantic communication systems. On the other hand, existing privacy protection methods such as differential privacy might significantly impact the performance of semantic communication systems because they directly inject noise into the transmitted features.

SUMMARY OF THE INVENTION

To address the shortcomings of existing technologies, this invention takes into account both privacy concerns and edge inference. It provides a privacy-preserving task-oriented semantic communication method and system. Specifically, the features transmitted by this invention enable low-latency edge inference while meeting distortion constraints at the adversary's end. This approach effectively mitigates model inversion attacks. To achieve this, the present invention utilizes an information bottleneck and distortion function to construct a Lagrangian function, effectively balancing both privacy and edge inference performance. The variational approximation, re-parameterization technique and Monte Carlo sampling are used to compute the mutual information terms in the objective function. In the process of training, the semantic communication system is trained based on adversarial learning mechanism, and the output features of the transmitter can deceive potential opponents by maximizing reconstruction distortion.

The Technical Scheme of the Invention

A privacy-preserving task-oriented semantic communication method is proposed, where the communication scenario involves a user, an edge server, and a potential adversary. The specific steps include:

Constructing a privacy-preserving task-oriented semantic communication system model;

Constructing an objective function based on the established semantic communication system model from step (1) and the privacy requirements;

Reconstructing the objective function constructed in step (2) using variational approximations, Monte Carlo sampling, and reparameterization techniques;

Designing an adversarial learning mechanism to train the semantic communication system model based on the transformed objective function from step (3);

Performing task-oriented semantic communication using the trained semantic communication system model obtained from step (4), which includes: the transmitter extracting and transmitting task-relevant semantic information from the image input; transmitting the semantic information through a wireless channel; and the receiver completing task inference based on the received signal.

The semantic communication system model comprises a transmitter network and a receiver network. The transmitter network comprises a feature extractor and a joint source-channel (JSC) encoder, while the receiver network includes a task inference module and a data reconstruction module;

The feature extractor extracts task-relevant semantic information from the input, after which the JSC encoder maps the task-relevant semantic information to channel input symbols. The process is represented as (I):

$$z = T_\theta(s), \tag{I}$$

where $s \in \square^n$ is the input $z \in \square^k$ represents the channel input symbol. $T_\theta(\bullet)$ stands for transmitter network (i.e. feature extractor and JSC encoder), $\theta$ is its parameters.

z is transmitted through wireless channels, and the signal $\hat{z}$ received at the receiver is $\hat{z}=hz+n$, where h stands for channel gain, and n is additive white Gaussian noise.

The task inference module uses the received signal $\hat{z}$ directly for task execution, which is represented as (II):

$$\hat{y} = R_\phi(\hat{z}), \tag{II}$$

where $\hat{z} \in \square^k$ is the channel output. $\hat{y} \in \square^l$ represents the inference result. $R_\phi(\cdot)$ stands for task inference module, $\phi$ is its parameters.

a. The data reconstruction module reconstructs the received signal $\hat{z}$ into the original input, and this process is expressed as (III):

$$\hat{s} = D_\gamma(\hat{z}), \tag{III}$$

where $\hat{s}\in$□" is the reconstructed output. $D_\gamma(\cdot)$ represents data reconstruction module, $\gamma$ stands for its parameters.

a. In step (2), the constructed objective function is (IV):

$$\min_{\theta,\phi} \lambda L_{IB} - (1-\lambda)\lambda L_{MSE}, \tag{IV}$$

where the first item $L_{IB}$ is information bottleneck loss; The second item $L_{MSE}$ is mean square error loss; $\lambda$ is the trade-off parameter between privacy and edge inference performance, and its range is [0,1].

In step (3), the objective function constructed in step (2) is reconstructed and expressed as (V):

$$\min_{\theta,\phi} \lambda L_{VIB} - (1-\lambda)\lambda L_{MSE} = \min_{\theta,\phi} \lambda\left\{\frac{1}{M}\sum_{m=1}^{M}\left\{-\frac{1}{N}\sum_{n=1}^{N}\log q_\phi(y_m|\hat{z}_{m,n}) + \beta KL(p(\hat{z}_m|s_m)\|q(\hat{z}))\right\}\right\} - \frac{1}{M}\sum_{i=1}^{M}\|s_i-\hat{s}_i\|^2, \tag{V}$$

where $L_{VIB}$ is information bottleneck loss; $L_{MSE}$ is mean square error loss; $\lambda$ is the trade-off parameter between privacy and edge inference performance; $s_i$ is i-th sample of image dataset; $\hat{s}_i$ is reconstruction of $s_i$. M stands for a total of M pairs $(s_i, y_i)$; N is the number of samples taken from the noise channel for each pair $(s_i, y_i)$; $\beta$ is a constant; $KL(\cdot\|\cdot)$ is the divergence and is used to calculate the difference between two distributions.

a. In step (4), based on the objective function reconstructed in step (3), adversarial learning mechanism is designed to train the semantic communication system model. The specific training steps are as follows:

Randomly initialize the parameters of the semantic communication system model;

The training data is input into the semantic communication system model. The training data is image data, which is divided into S1 and S2;

Simulate potential adversary, namely training data reconstruction module;

Simulate the user, train the transmitter network;

Steps 3) and 4) are performed alternately until the termination condition is met, then output the parameters $\theta$ and $\phi$ of the semantic communication system model.

In step 3), the specific implementation process includes:

The transmitter network extracts and transmits task-related semantic information. The specific is as follows: $T_\theta(s_1)\rightarrow z_1$. $s_1$ is the training data, from the S1; $z_1$ is the extracted feature of the transmitter network;

$z_1$ is transmitted over wireless channels;

The data reconstruction module reconstructs the original input based on the received $\hat{z}_1$. The specific is as follows: $D_\gamma(\hat{z}_1)\rightarrow\hat{s}_1$. $\hat{z}_1$ is the representation of $z_1$ after passing through the wireless channel, and $\hat{s}_1$ is the recovery of $s_1$;

Calculate the mean square error loss based on (VI):

$$L_{MSE} = \frac{1}{M}\sum_{i=1}^{M}\|s_{1,i}-\hat{s}_{1,i}\|^2, \tag{VI}$$

where $L_{MSE}$ is mean square error loss; M indicates the number of sample; $s_{1,i}$ is the i-th sample in the input image dataset $s_1$; $\hat{s}_{1,i}$ is the recovery of $s_{1,i}$;

The transmitter network parameters are frozen, and the Adam optimizer is used to update the network parameter $\gamma$ of the data reconstruction module.

In step 4), the specific implementation process is as follows:

The transmitter network extracts and transmits task-related semantic information. The specific is as follows: $T_\theta(s_2)\rightarrow z_2$. $s_2$ is the training data, from the S2; $z_2$ is the extracted feature of the transmitter network;

$z_2$ is transmitted over wireless channels;

The task inference module performs task inference based on the received $\hat{z}_2$. The specific is as follows: $R_\phi(\hat{z}_2)\rightarrow\hat{y}_2$. The data reconstruction module reconstructs the original input based on the received $\hat{z}_2$. The specific is as follows: $D_\gamma(\hat{z}_2)\rightarrow\hat{s}_2$. $\hat{z}_2$ is the representation of $z_2$ after passing through the wireless channel, and $\hat{s}_2$ is the recovery of $s_2$; $\hat{y}_2$ is the output of the task inference module;

Calculate the loss based on (V);

The data remodeling network parameters are frozen, and the transmitter network parameters and the task inference module network parameters are updated through the Adam optimizer.

A computer device comprising memory and a processor, wherein the memory stores a computer program, and the processor, when executing the computer program, implements the steps of a task-oriented semantic communication method that ensures privacy protection.

A computer-readable storage medium storing a computer program, wherein the said computer program, when executed by a processor, implements the steps of a task-oriented semantic communication method that ensures privacy protection.

A privacy-preserving task-oriented semantic communication system:

The semantic communication system model building module is configured to: build a privacy-preserving task-oriented semantic communication system model;

The objective function construction module is configured to: construct the objective function according to the established semantic communication system model and privacy requirements;

The objective function reconstruction module is configured to: reconstruct the constructed objective function;

The semantic communication system model training module is configured as follows: based on the reconstructed objective function, the adversarial learning mechanism is designed to train the semantic communication system model;

The task execution module is configured to: conduct task-oriented semantic communication through the trained semantic communication system model.

The Invention has the Following Beneficial Effects

Aiming at the privacy problems in the semantic communication system and the difficulty of the existing privacy methods to directly apply to the semantic communication system, the invention proposes a privacy-preserving task-oriented semantic communication method and system. Firstly, the Lagrange function is constructed by using the information bottleneck and distortion measure as the final objective function. The semantic communication system is then trained based on adversarial learning mechanisms so that the transmitted features of the transmitter can deceive potential adversaries while ensuring low-delay edge inference. Compared to existing designs, the proposed solution in this invention achieves a good balance between privacy and utility.

DETAILED DESCRIPTION OF THE INVENTION

The present invention is further defined in combination with the drawings and embodiments in the specification, but is not limited to this.

Implementation Example 1

Figure 1:
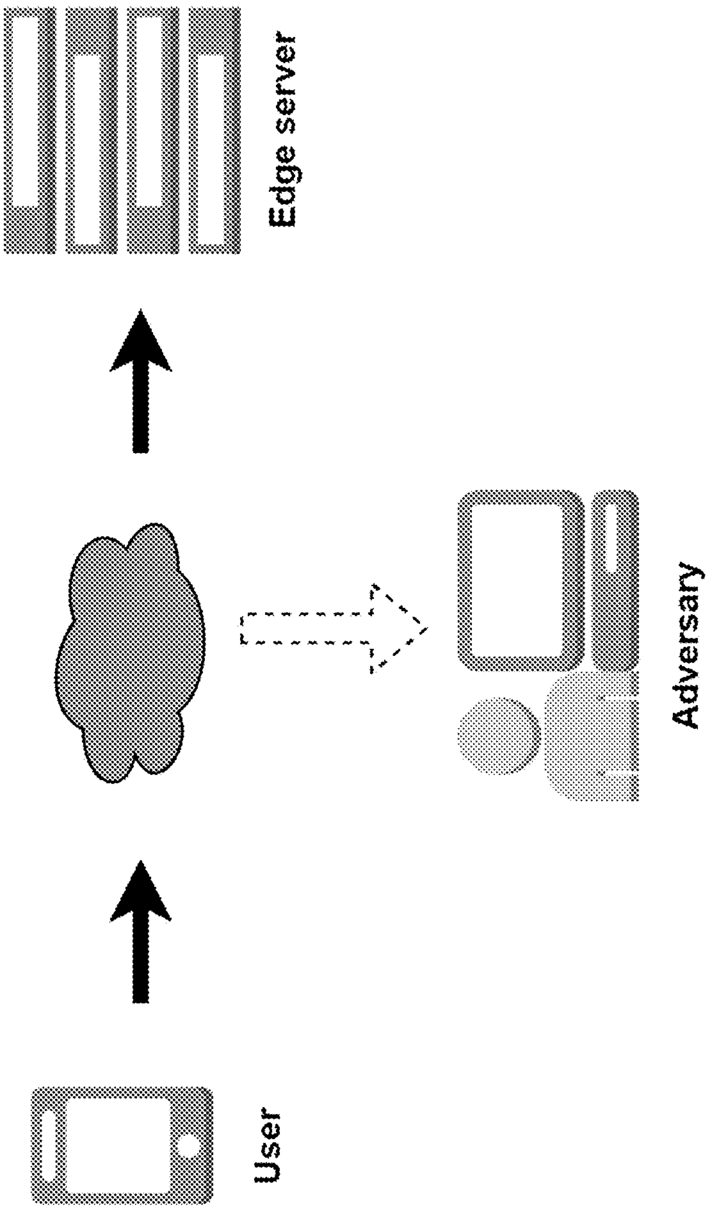
FIG. 1 is a schematic diagram illustrating the operational scenario of the privacy-preserving task-oriented semantic communication method in this invention.

As shown in FIG. 1, a privacy-preserving task-oriented semantic communication method is proposed, and the method operates in a scenario that includes a user, an edge server, and a potential adversary. The user extracts the task-related semantic information from the input and transmits it to the edge server. The edge server performs task inference based on the received task-related information. The opponent illegally obtains the transmitted signal and reconstructs the original input through model inversion attack, thus violating the user's privacy. The invention aims to realize privacy-utility tradeoff, and proposes a privacy-preserving task-oriented semantic communication method. Specific steps include:

(1) Constructing a privacy-preserving task-oriented semantic communication system model;

(2) Constructing an objective function based on the established semantic communication system model from step (1) and the privacy requirements;

(3) Reconstructing the objective function constructed in step (2) using variational approximations, Monte Carlo sampling, and reparameterization techniques;

(4) Designing an adversarial learning mechanism to train the semantic communication system model based on the transformed objective function from step (3);

(5) Performing task-oriented semantic communication using the trained semantic communication system model obtained from step (4), which includes: the transmitter extracting and transmitting task-relevant semantic information from the image input (Taking the image classification task on the MNIST dataset as an example, the image input is the image pixel; Semantic information refers to feature vectors related to MNIST categories); transmitting the semantic information through a wireless channel; and the receiver completing task inference based on the received signal.

Implementation Example 2

Figure 2:
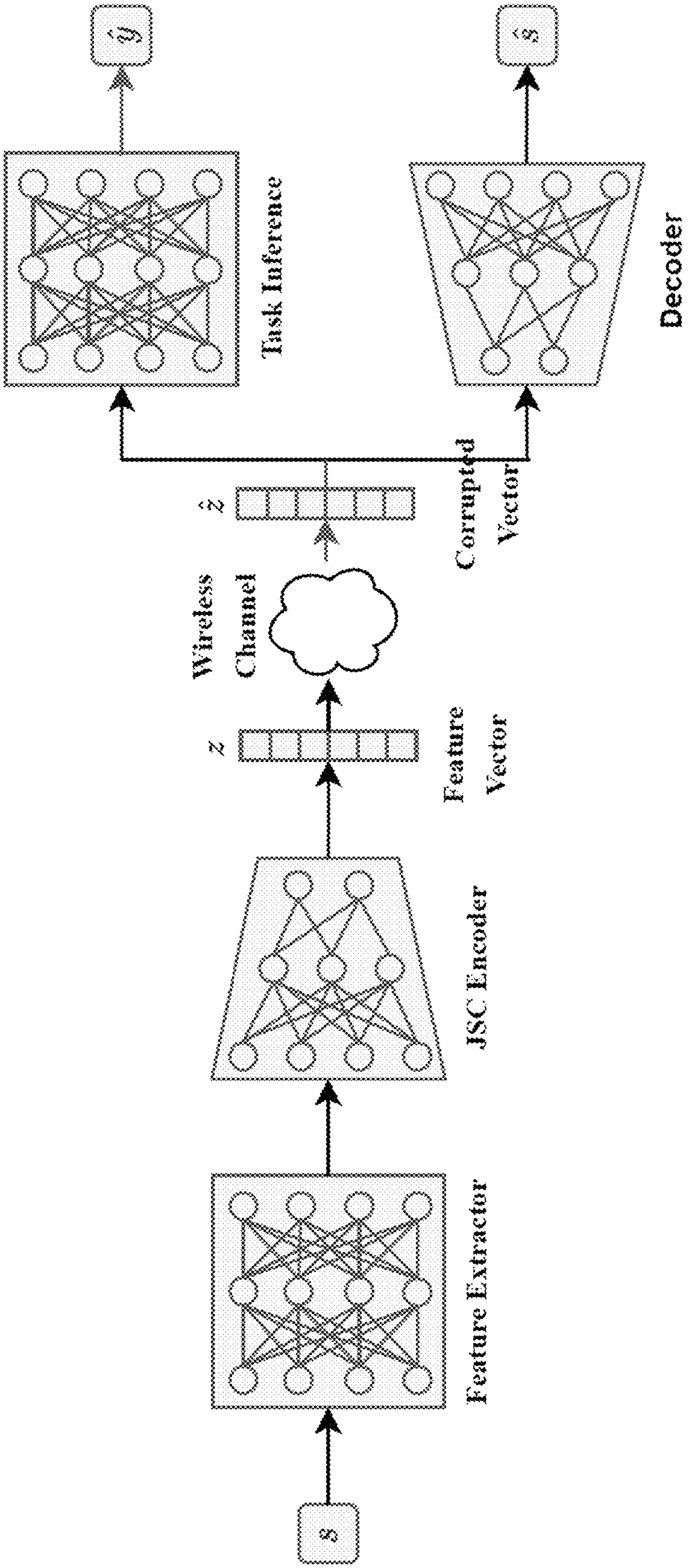
FIG. 2 is a structural diagram of the semantic communication system model in the invention.

According to Embodiment 1, a privacy-preserving task-oriented semantic communication method is described. The differences are as follows:

As shown in FIG. 2, the semantic communication system model comprises a transmitter network and a receiver network. The transmitter network consists of a feature extractor and a joint source-channel (JSC) encoder. The receiver network comprises a task inference module and a data reconstruction module. The feature extractor is a convolutional neural network consisting of three convolutional layers. The JSC encoder is a convolutional neural network comprising one convolutional layer and one fully connected layer. The task inference module is a convolutional neural network comprising two convolutional layers and two fully connected layers. The data reconstruction module is a convolutional neural network consisting of four convolutional layers and one fully connected layer.

The feature extractor extracts task-relevant semantic information from the input, after which the JSC encoder maps the task-relevant semantic information to channel input symbols. The process is represented as (I):

$$z = T_\theta(s), \tag{I}$$

$s \in \square^n$ is the input $z \in \square^k$ represents the channel input symbol. $T_\theta(\cdot)$ stands for transmitter network (i.e. feature extractor and JSC encoder), $\theta$ is its parameters.

z is transmitted through wireless channels, and the signal $\hat{z}$ received at the receiver is $\hat{z}=hz+n$, where h stands for channel gain, and n is additive white Gaussian noise.

The task inference module uses the received signal $\hat{z}$ directly for task execution, which is represented as (II):

$$\hat{y} = R_\phi(\hat{z}), \tag{II}$$

where $\hat{z} \in \sqcup^k$ is the channel output. $\hat{y} \in \sqcup^l$ represents the inference result. $R_\phi(\cdot)$ stands for task inference module, $\phi$ is its parameters.

a. The data reconstruction module reconstructs the received signal $\hat{z}$ into the original input, and this process is expressed as (III):

$$\hat{s} = D_\gamma(\hat{z}), \tag{III}$$

where $\hat{s} \in \square^n$ is the reconstructed output. $D_\gamma(\cdot)$ represents data reconstruction module, $\gamma$ stands for its parameters.

In step (2), the constructed objective function is (IV):

$$\min_{\theta,\phi} \lambda L_{IB} - (1-\lambda)\lambda L_{MSE}, \tag{IV}$$

where the first item $L_{IB}$ is information bottleneck loss; The second item $L_{MSE}$ is mean square error loss; $\lambda$ is the trade-off parameter between privacy and edge inference performance, and its range is [0,1].

In step (3), the objective function constructed in step (2) is reconstructed to make it easy to calculate, as follows:

The information bottleneck loss is expressed as:

$$\begin{aligned} L_{IB} &= -I(\hat{Z};Y) + \beta I(\hat{Z};S) \\ &= -\int dyd\hat{z}p(y,\hat{z})\log\frac{p(y,\hat{z})}{p(y)p(\hat{z})} + \beta\int dsd\hat{z}p(s,\hat{z})\log\frac{p(s,\hat{z})}{p(s)p(\hat{z})} \\ &= -\int dyd\hat{z}p(y|\hat{z})p(\hat{z})\log p(y|\hat{z}) - H(Y) + \beta\int dsd\hat{z}p(\hat{z}|s)p(s) \\ &\qquad \log\frac{p(\hat{z}|s)}{p(\hat{z})}, \end{aligned} \tag{V}$$

where Y is the target variable. H(Y) is entropy. According to the semantic communication system model established in step (1), $p(\hat{z}|s)$ is represented as $p(\hat{z}|s)=p_\theta(\hat{z}|z)\,p_{channel}(\hat{z}|z)$ in (V), where $p_\theta(z|s)$ is the coding distribution and $p_{channel}(\hat{z}/z)$ is the channel distribution. $p(\hat{z})$ and $p(y|\hat{z})$ follow Markov chain $Y\leftrightarrow S\leftrightarrow \hat{Z}$ and are denoted by:

$$p(\hat{z}) = \int dsp(s)p(\hat{z}\mid s), \tag{VI}$$

$$\begin{aligned} p(y|\hat{z}) &= \int dsp(s,y\mid\hat{z}) \\ &= \int dsp(y\mid s)p(s\mid\hat{z}) \\ &= \int ds\frac{p(y\mid s)p(\hat{z}\mid s)p(s)}{p(\hat{z})} \end{aligned} \tag{VII}$$

In (V), H(Y) depends on the input data and can be ignored during optimization. For $p(\hat{z})$ and $p(y|\hat{z})$ which are difficult to compute in high dimensional space, variational distributions q(z) and $q_\phi(y|\hat{z})$ are used to replace them. Thus, (V) can be expressed as (VIII):

$$\begin{aligned} L_{VIB} &= -\int dsdyd\hat{z}p(s,y)p(\hat{z}\mid s)\log q_\phi(y\mid\hat{z}) + \beta\int dsdyd\hat{z}p(s,y)p(\hat{z}\mid s)\log\frac{p(\hat{z}|s)}{q(\hat{z})} \\ &= E_{p(s,y)}\{E_{p(z|s)}[-\log q_\phi(y\mid\hat{z})] + \beta KL(p(\hat{z}\mid s)\|\,q(\hat{z}))\} \end{aligned} \tag{VIII}$$

By using reparameterization techniques and Monte Carlo sampling, an unbiased estimate of $L_{VIB}$ can be further obtained, which is expressed as (IX):

$$L_{VIB} \approx \frac{1}{M}\sum_{m=1}^{M}\left\{-\frac{1}{N}\sum_{n=1}^{N}\log q_\phi(y_m|\hat{z}_{m,n}) + \beta KL(p(\hat{z}_m|s_m)\|q(\hat{z}))\right\}, \tag{IX}$$

where M stands for a total of M pairs $(s_i, y_i)$; N is the number of samples taken from the noise channel for each pair $(s_i, y_i)$.

The mean square error loss $L_{MSE}$ is expressed as (X):

$$L_{MSE} = \frac{1}{M}\sum_{i=1}^{M}\|s_i - \hat{s}_i\|^2. \tag{X}$$

Substituting (IX) and (X) into (IV), the final objective function is obtained as follows:

$$\begin{aligned} &\min_{\theta,\phi}\ \lambda L_{VIB} - (1-\lambda)\lambda L_{MSE} \\ &= \min_{\theta,\phi}\ \lambda\left\{\frac{1}{M}\sum_{m=1}^{M}\left\{-\frac{1}{N}\sum_{n=1}^{N}\log q_\phi(y_m|\hat{z}_{m,n}) + \beta KL(p(\hat{z}_m\mid s_m)\|\,q(\hat{z}))\right\}\right\}, \\ &\quad -\frac{1}{M}\sum_{i=1}^{M}\|s_i - \hat{s}_i\|^2 \end{aligned} \tag{XI}$$

where $L_{VIB}$ is information bottleneck loss; $L_{MSE}$ is mean square error loss; λ is the trade-off parameter between privacy and edge inference performance; $s_i$ is i-th sample of image dataset; $\hat{s}_i$ is reconstruction of $s_i$. M stands for a total of M pairs $(s_i, y_i)$; N is the number of samples taken from the noise channel for each pair $(s_i, y_i)$; β is a constant; $KL(\cdot\|\cdot)$ is the divergence and is used to calculate the difference between two distributions.

In step (4), based on the objective function reconstructed in step (3), adversarial learning mechanism is designed to train the semantic communication system model. The specific training steps are as follows:

Randomly initialize the parameters of the semantic communication system model;

The training data is input into the semantic communication system model. The training data is image data, which is divided into S1 and S2;

Simulate potential adversary, namely training data reconstruction module;

Simulate the user, train the transmitter network;

Steps 3) and 4) are performed alternately until the termination condition (e.g. maximum number of iterations) is met, then output the parameters θ and ϕ of the semantic communication system model.

In step 3), the specific implementation process includes:

The transmitter network extracts and transmits task-related semantic information. The specific is as follows: $T_\theta(s_1)\rightarrow z_1$. $s_1$ is the training data, from the S1; $z_1$ is the extracted feature of the transmitter network;

$z_1$ is transmitted over wireless channels;

The data reconstruction module reconstructs the original input based on the received $\hat{z}_1$. The specific is as follows: $D_\gamma(\hat{z}_1)\rightarrow\hat{s}_1$. $\hat{z}_1$ is the representation of $z_1$ after passing through the wireless channel, and $\hat{s}_1$ is the recovery of $s_1$;

Calculate the mean square error loss based on (XII):

$$L_{MSE} = \frac{1}{M}\sum_{i=1}^{M}\|s_{1,i} - \hat{s}_{1,i}\|^2, \tag{XII}$$

where $L_{MSE}$ is mean square error loss; M indicates the number of sample; $s_{1,i}$ is the i-th sample in the input image dataset $s_1$; $\hat{s}_{1,i}$ is the recovery of $s_{1,i}$;

The transmitter network parameters are frozen, and the Adam optimizer is used to update the network parameter γ of the data reconstruction module.

In step 4), the specific implementation process is as follows:

The transmitter network extracts and transmits task-related semantic information. The specific is as follows:

$T_\theta(s_2) \rightarrow z_2$. $s_2$ is the training data, from the S2; $z_2$ is the extracted feature of the transmitter network;

$z_2$ is transmitted over wireless channels;

The task inference module performs task inference based on the received $\hat{z}_2$. The specific is as follows: $R_\phi(\hat{z}_2) \rightarrow \hat{y}_2$. The data reconstruction module reconstructs the original input based on the received $\hat{z}_2$. The specific is as follows: $D_\gamma(\hat{z}_2) \rightarrow \hat{s}_2$. $\hat{z}_2$ is the representation of $z_2$ after passing through the wireless channel, and $\hat{s}_2$ is the recovery of $s_2$; $\hat{y}_2$ is the output of the task inference module;

Calculate the loss based on (XI);

The data remodeling network parameters are frozen, and the transmitter network parameters and the task inference module network parameters are updated through the Adam optimizer.

In step 4), the specific implementation process is as follows:

The transmitter network extracts and transmits task-related semantic information. The specific is as follows: $T_\theta(s_2) \rightarrow z_2$. $s_2$ is the training data, from the S2; $z_2$ is the extracted feature of the transmitter network;

$z_2$ is transmitted over wireless channels;

The task inference module performs task inference based on the received $\hat{z}_2$. The specific is as follows: $R_\phi(\hat{z}_2) \rightarrow \hat{y}_2$. The data reconstruction module reconstructs the original input based on the received $\hat{z}_2$. The specific is as follows: $D_\gamma(\hat{z}_2) \rightarrow \hat{s}_2$. $\hat{z}_2$ is the representation of $z_2$ after passing through the wireless channel, and $\hat{s}_2$ is the recovery of $s_2$; $\hat{y}_2$ is the output of the task inference module;

Calculate the loss based on (V);

The data remodeling network parameters are frozen, and the transmitter network parameters and the task inference module network parameters are updated through the Adam optimizer.

To validate the effectiveness of the present invention, testing was conducted on the MNIST dataset. The adopted comparative methods are the existing semantic communication methods and the combination of this method with differential privacy.

Figure 3:
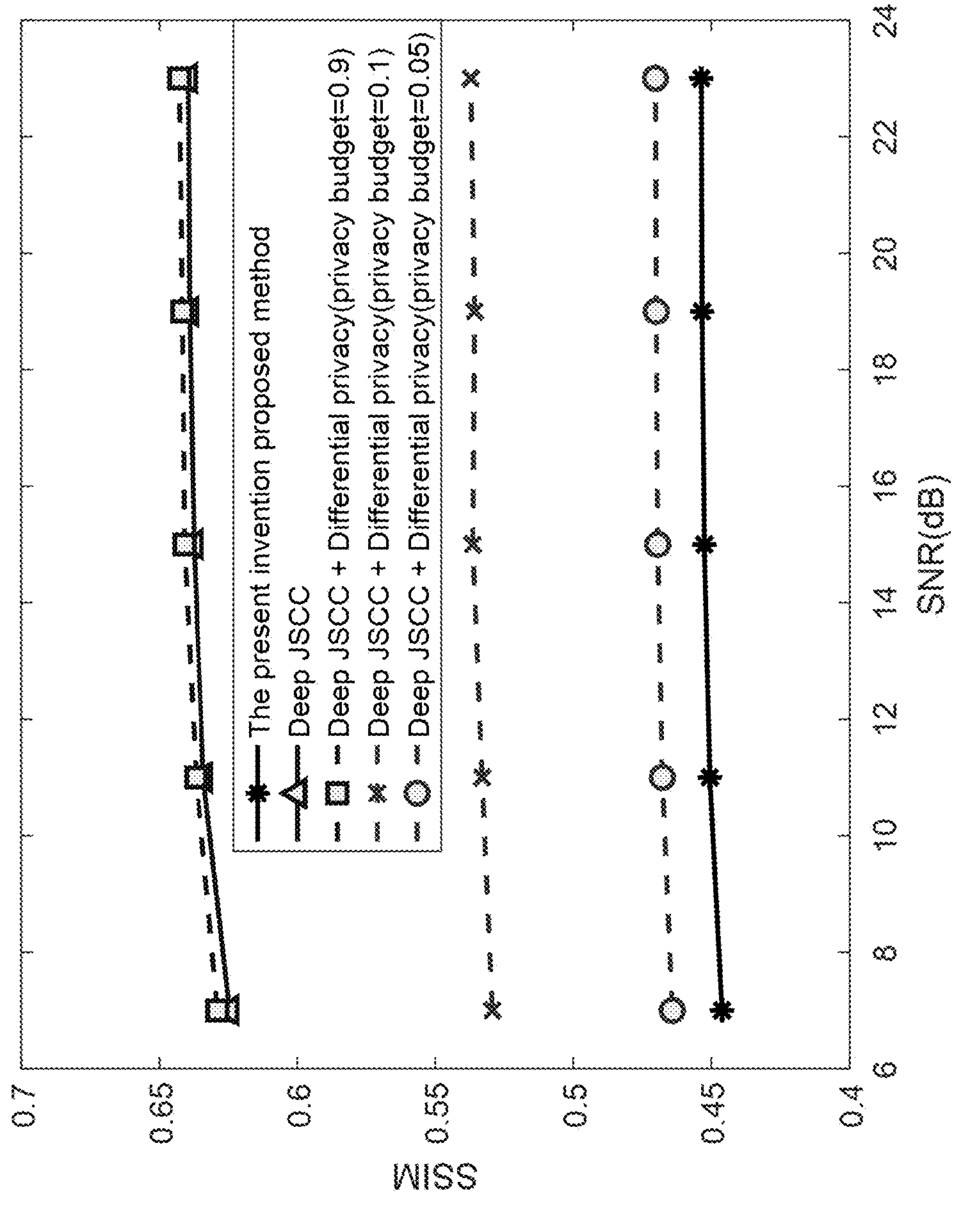
FIG. 3 shows the relationship between the privacy measurement metrics SSIM (Structural Similarity Index) and SNR (Signal-to-Noise Ratio) of the semantic communication method proposed in this invention and the existing Deep JSCC method.

From FIG. 3, it is evident that the method proposed in this invention, through iterative optimization, makes the extracted and transmitted features difficult to be effectively reconstructed into the original image by adversaries (i.e., indicated by the low SSIM index values evaluating image quality). This indicates the method's capability to effectively protect user privacy.

Figure 4:
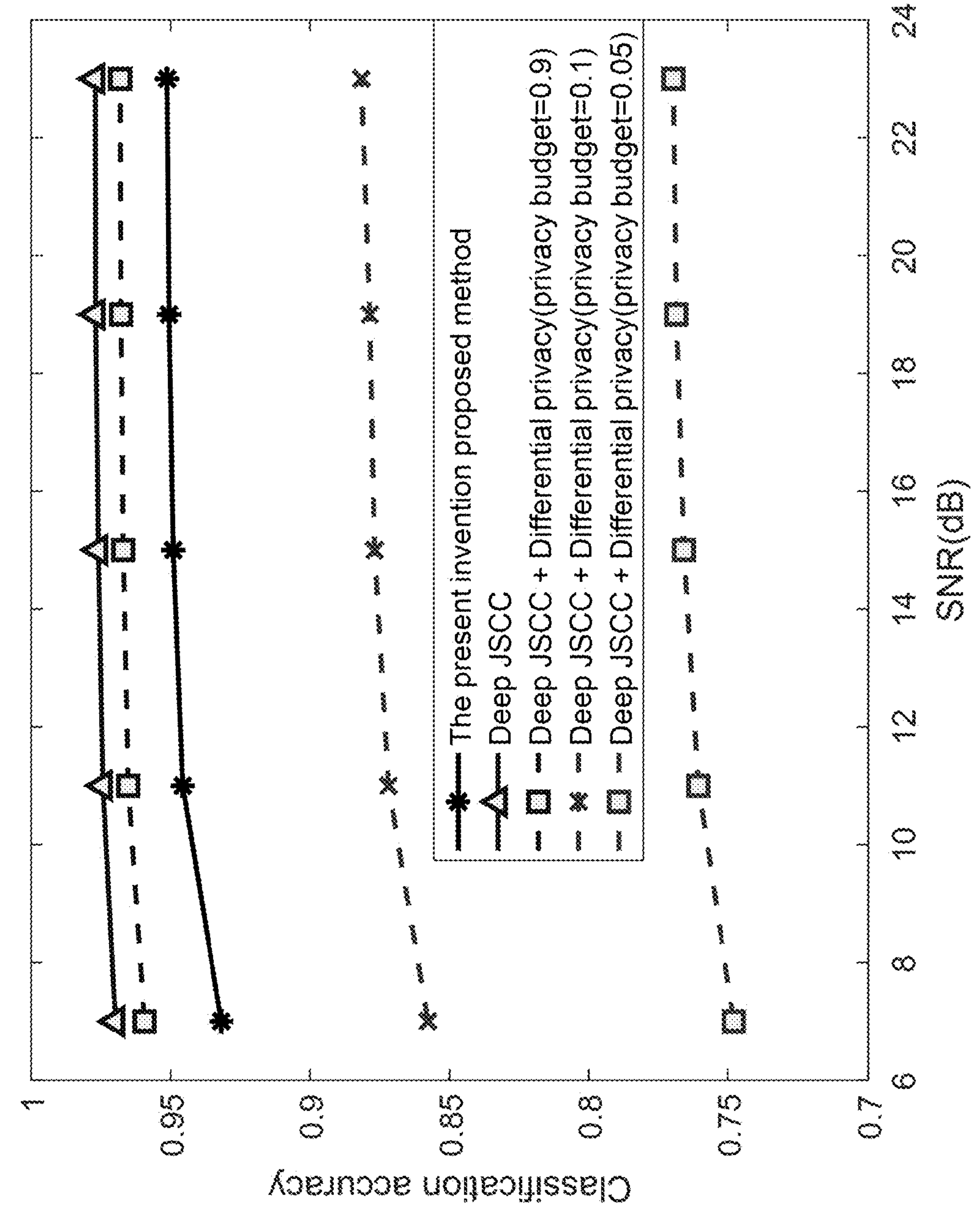
FIG. 4 shows the relationship between classification accuracy and SNR of the semantic communication method provided by the invention and the existing Deep JSCC method.

From FIG. 4, it is evident that the method proposed in this invention maintains high performance in edge inference tasks (i.e., high classification accuracy) while effectively protecting user privacy. In contrast, traditional semantic communication methods incorporating commonly differential privacy experience significant performance drops in task performance (i.e., decreased classification accuracy) when privacy requirements are increased.

Implementation Example 3

A computer device comprising memory and a processor, wherein the memory stores a computer program, and the processor, when executing the computer program, implements the steps of the privacy-preserving task-oriented semantic communication method as described in embodiments 1 or 2.

Implementation Example 4

A computer-readable storage medium storing a computer program, wherein the computer program, when executed by a processor, implements the steps of the privacy-preserving task-oriented semantic communication method as described in embodiments 1 or 2.

Implementation Example 5

A privacy-preserving task-oriented semantic communication system:

The semantic communication system model building module is configured to: build a privacy-preserving task-oriented semantic communication system model;

The objective function construction module is configured to: construct the objective function according to the established semantic communication system model and privacy requirements;

The objective function reconstruction module is configured to: reconstruct the constructed objective function;

The semantic communication system model training module is configured as follows: based on the reconstructed objective function, the adversarial learning mechanism is designed to train the semantic communication system model;

The task execution module is configured to: conduct task-oriented semantic communication through the trained semantic communication system model.

What is claimed is:

1. A method for privacy-preserving a task-oriented semantic communication comprising a user, an edge server, and a potential adversary; wherein a computer readable medium operable on a computer with memory for protecting privacy while executing tasks with low latency on the edge side, and comprising program instructions for executing the following steps of:

(i) constructing a privacy-preserving task-oriented semantic communication system model;

(ii) constructing an objective function based on the established semantic communication system model from step (i) and the privacy requirements;

(iii) reconstructing the objective function constructed in step (ii) using variational approximations, Monte Carlo sampling, and reparameterization techniques;

(iv) designing an adversarial learning mechanism to train the semantic communication system model based on the transformed objective function from step (iii);

(v) performing task-oriented semantic communication using the trained semantic communication system model obtained from step (4), which comprises: the transmitter extracting and transmitting task-relevant semantic information from the image input; transmitting the semantic information through a wireless channel; and the receiver completing task inference based on the received signal; and (vi) improving privacy in the task-oriented semantic communication;

wherein the constructed objective function is (IV):

$$\min_{\phi,\theta} \lambda L_{IB} - (1-\lambda)\lambda L_{MSE}, \tag{IV}$$

where $L_{IB}$ is the information bottleneck loss, $L_{MSE}$ is the mean square error loss, and $\lambda$ is the trade-off parameter between privacy and edge inference performance, with a range of [0,1];

in step (iii), the objective function constructed in step (ii) is reconstructed and expressed as (V):

$$\min_{\theta,\phi} \lambda L_{VIB} - (1-\lambda)\lambda L_{MSE} \tag{V}$$
$$= \min_{\theta,\phi} \lambda\left\{\frac{1}{M}\sum_{m=1}^{M}\left\{-\frac{1}{N}\sum_{n=1}^{N}\log q_{\phi}(y_m \mid \hat{z}_{m,n}) + \beta KL(p(\hat{z}_m \mid s_m)\| q(\hat{z}))\right\}\right\},$$
$$-\frac{1}{M}\sum_{i=1}^{M}\|s_i - \hat{s}_i\|^2$$

where $L_{VIB}$ is the information bottleneck loss, $L_{MSE}$ is the mean square error loss, λ is the trade-off parameter between privacy and edge inference performance, $s_i$ is i-th sample of image dataset, and $\hat{s}_i$ is a reconstruction of $s_i$; M stands for a total of M pairs ($s_i$, $y_i$), N is the number of samples taken from the noise channel for each pair ($s_i$, $y_i$), β is a constant, and KL (·||·) is the divergence, which is used to calculate the difference between two distributions;

in step (iv), based on the objective function reconstructed in step (iii), adversarial learning mechanism is designed to train the semantic communication system model; the specific training steps are as follows:

a) randomly initialize the parameters of the semantic communication system model;

b) the training data is input into the semantic communication system model, the training data is image data, which is divided into S1 and S2;

c) simulate potential adversary, namely training data reconstruction module;

d) simulate the user, train the transmitter network;

e) steps c) and d) are performed alternately until the termination condition is met, then output the parameters θ and ϕ of the semantic communication system model;

in step c), the specific implementation process includes:

A) the transmitter network extracts and transmits task-related semantic information; the specific is as follows: $T_\theta(s_i)\rightarrow z_1$; $s_1$ is the training data, from the S1; $z_1$ is the extracted feature of the transmitter network;

B) $z_1$ is transmitted over wireless channels;

C) the data reconstruction module reconstructs the original input based on the received ẑ21; the specific is as follows: $D_\gamma(\hat{z}_1)\rightarrow\hat{s}_1$; $\hat{z}_1$ is the representation of $z_1$ after passing through the wireless channel, and $\hat{s}_1$ is the recovery of $s_1$;

D) calculate the mean square error loss based on (VI):

$$L_{MSE} = \frac{1}{M}\sum_{i=1}^{M}\|s_{1,i} - \hat{s}_{1,i}\|^2, \tag{VI}$$

where $L_{MSE}$ is the mean square error loss, M indicates the number of sample, $s_{1,i}$ is the i-th sample in the input image dataset $s_1$, and $\hat{s}_{1,i}$ is the recovery of $s_{1,i}$;

E) the transmitter network parameters are frozen, and the Adam optimizer is used to update the network parameter γ of the data reconstruction module;

in step e), the specific implementation process is as follows:

A) the transmitter network extracts and transmits task-related semantic information, the specific is as follows: $T_\theta(S2)\rightarrow z_2$; $s_2$ is the training data, from the S2 and $z_2$ is the feature extracted by the transmitter network;

B) $z_2$ is transmitted over wireless channels;

C) the task inference module performs task inference based on the received $\hat{z}_2$; the specific is as follows: $R_\phi(\hat{z}_2)\rightarrow\hat{y}_2$ the data reconstruction module reconstructs the original input based on the received; the specific is as follows: $D_\gamma(\hat{z}_2)\rightarrow\hat{s}_2$; $\hat{z}_2$ is the representation of $z_2$ after passing through the wireless channel, and $\hat{s}_2$ is the recovery of $\hat{s}_2$; $\hat{y}_2$ is the output of the task inference module;

D) calculate the loss based on (V);

E) the data remodeling network parameters are frozen, and the transmitter network parameters and the task inference module network parameters are updated through the Adam optimizer.

2. The method according to claim 1, wherein the semantic communication system model comprises a transmitter network and a receiver network; the transmitter network includes a feature extractor and a joint source-channel (JSC) encoder, and the receiver network includes a task inference module and a data reconstruction module;

the feature extractor extracts task-relevant semantic information from the input, after which the JSC encoder maps the task-relevant semantic information to channel input symbols; the process is represented as (I):

$$z = T_\theta(s), \tag{I}$$

where s∈⌴" is the input z∈⌴$^k$ represents the channel input symbol. $T_\theta(\cdot)$ stands for the transmitter network (i.e. the feature extractor and the JSC encoder), and θ is its parameters;

z is transmitted through wireless channels, and the signal ẑ received at the receiver is ẑ=hz+n, where h stands for channel gain, and n is additive white Gaussian noise;

the task inference module uses the received signal ẑ directly for task execution, which is represented as (II):

$$\hat{y} = R_\phi(\hat{z}), \tag{II}$$

where ẑ∈⌴$^k$ is the channel output. ŷ∈⌴$^l$ represents the inference result. $R_\phi(\cdot)$ stands for task inference module, and ϕ is its parameters;

the data reconstruction module reconstructs the received signal i into the original input, and this process is expressed as (III):

$$\hat{s} = D_\gamma(\hat{z}), \tag{III}$$

where ẑ∈⌴" is the reconstructed output; $D_\gamma(\cdot)$ represents data reconstruction module, and γ stands for its parameters.

3. The method according to claim 1, wherein comprising a computer device that comprises a memory and a processor; the memory stores a computer program; the processor, when executing the computer program, implements the steps of the privacy-preserving task-oriented semantic communication method.

4. The method according to claim 1, wherein comprising a computer-readable storage medium that stores thereon a computer program; the computer program, when executed by a processor, implements the steps of the privacy-preserving task-oriented semantic communication method.

5. A privacy-preserving task-oriented semantic communication system is characterized in the following aspects:

the semantic communication system model building module is configured to: build a privacy-preserving task-oriented semantic communication system model;

the objective function construction module is configured to: construct the objective function according to the established semantic communication system model and privacy requirements;

the objective function reconstruction module is configured to: reconstruct the constructed objective function;

the semantic communication system model training module is configured as follows: based on the reconstructed objective function, the adversarial learning mechanism is designed to train the semantic communication system model;

the task execution module is configured to: conduct task-oriented semantic communication through the trained semantic communication system model;

the constructed objective function is (IV):

$$\min_{\phi,\theta} \lambda L_{IB} - (1-\lambda)\lambda L_{MSE}, \tag{IV}$$

where the first item $L_{IB}$ is the information bottleneck loss; the second item $L_{MSE}$ is the mean square error loss; $\lambda$ is the trade-off parameter between privacy and edge inference performance, with a range of [0,1];

in step (iii), the objective function constructed in step (ii) is reconstructed and expressed as (V):

$$\begin{aligned}&\min_{\theta,\phi} \lambda L_{VIB} - (1-\lambda)\lambda L_{MSE} \\ &= \min_{\theta,\phi} \lambda\left\{\frac{1}{M}\sum_{m=1}^{M}\left\{-\frac{1}{N}\sum_{n=1}^{N}\log q_\phi(y_m \mid \hat{z}_{m,n}) + \beta KL(p(\hat{z}_m \mid s_m) \| q(\hat{z}))\right\}\right\}, \\ &-\frac{1}{M}\sum_{i=1}^{M} \|s_i - \hat{s}_i\|^2\end{aligned} \tag{V}$$

where $L_{VIB}$ is the information bottleneck loss, $L_{MSE}$ is the mean square error loss, $\lambda$ is the trade-off parameter between privacy and edge inference performance, $s_i$ is i-th sample of image dataset and $\hat{s}_i$ is reconstruction of $s_i$; M stands for a total of M pairs $(s_i, y_i)$, N is the number of samples taken from the noise channel for each pair $(s_i, y_i)$, $\beta$ is a constant, and KL $(\cdot\|\cdot)$ is the divergence, which is used to calculate the difference between two distributions;

in step (iv), based on the objective function reconstructed in step (iii), adversarial learning mechanism is designed to train the semantic communication system model; the specific training steps are as follows:

a) randomly initialize the parameters of the semantic communication system model;

b) the training data is input into the semantic communication system model, the training data is image data, which is divided into S1 and S2;

c) simulate potential adversary, namely training data reconstruction module;

d) simulate the user, train the transmitter network;

e) steps c) and d) are performed alternately until the termination condition is met, then output the parameters $\theta$ and $\phi$ of the semantic communication system model;

in step c), the specific implementation process includes:

A) the transmitter network extracts and transmits task-related semantic information; the specific is as follows: $T_\theta(s_1) \rightarrow z_1$; $s_1$ is the training data, from the S1; $z_1$ is the extracted feature of the transmitter network;

B) $z_1$ is transmitted over wireless channels;

C) the data reconstruction module reconstructs the original input based on the received $\hat{z}_1$; the specific is as follows: $D_\gamma(\hat{z}_1) \rightarrow \hat{s}_1$. $\hat{z}_1$ is the representation of $z_1$ after passing through the wireless channel, and $\hat{s}_1$ is the recovery of $s_1$;

D) calculate the mean square error loss based on (VI):

$$L_{MSE} = \frac{1}{M}\sum_{i=1}^{M} \|s_{1,i} - \hat{s}_{1,i}\|^2, \tag{VI}$$

where $L_{MSE}$ is mean square error loss; M indicates the number of sample; $s_{1,i}$ is the i-th sample in the input image dataset $s_1$; $\hat{s}_{1,i}$ is the recovery of $s_{1,i}$;

E) the transmitter network parameters are frozen, and the Adam optimizer is used to update the network parameter $\gamma$ of the data reconstruction module;

in step e), the specific implementation process is as follows:

A) the transmitter network extracts and transmits task-related semantic information; the specific is as follows: $T_\theta(s_2) \rightarrow z_2$. $s_2$ is the training data, from the S2; $z_2$ is the extracted feature of the transmitter network;

B) $z_2$ is transmitted over wireless channels;

C) the task inference module performs task inference based on the received $\hat{z}_2$; the specific is as follows: $R_\phi(\hat{z}_2) \rightarrow \hat{y}_2$; the data reconstruction module reconstructs the original input based on the received $\hat{z}_2$; the specific is as follows: $D_\gamma(\hat{z}_2) \rightarrow \hat{s}_2$; $\hat{z}_2$ is the representation of $z_2$ after passing through the wireless channel, and $\hat{s}_2$ is the recovery of $s_2$; $\hat{y}_2$ is the output of the task inference module;

A) calculate the loss based on (V);

B) the data remodeling network parameters are frozen, and the transmitter network parameters and the task inference module network parameters are updated through the Adam optimizer.

* * * * *